F. P. VAUGHAN.
VEHICLE WHEEL.
APPLICATION FILED JULY 20, 1907.
944,641.
Patented Dec. 28, 1909.
3 SHEETS—SHEET 1.
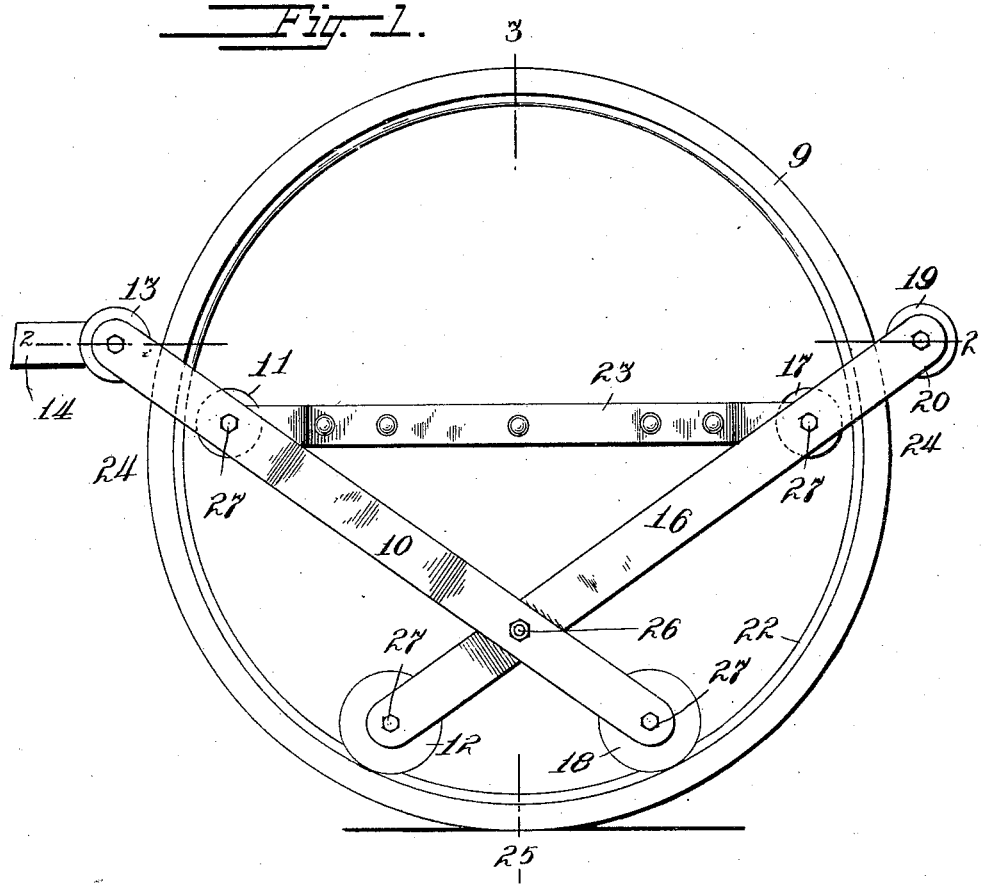
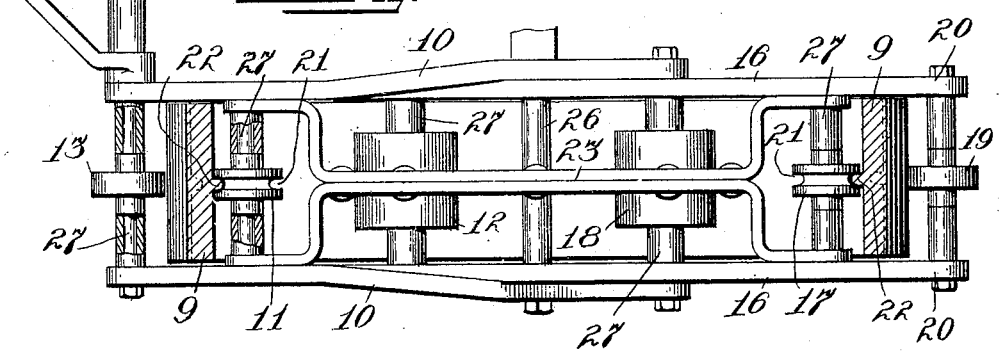
Witnesses
Milton Lenoir
J. E. Kellogg.
Inventor
Frederick P. Vaughan,
By Clarence W Taylor
Attorney.

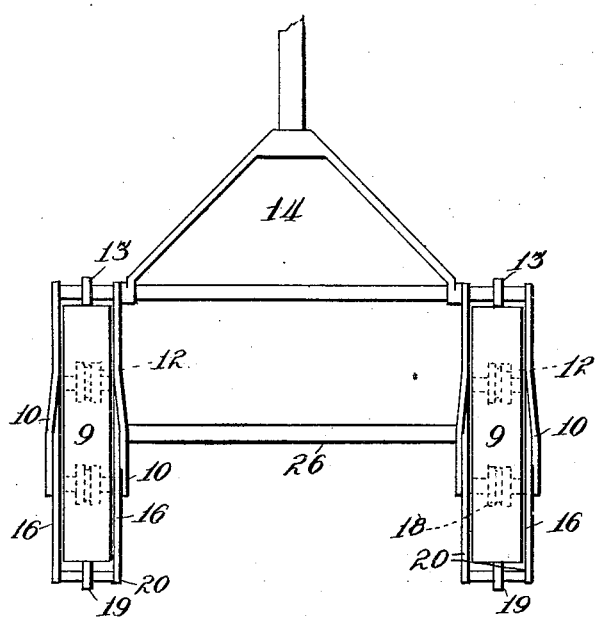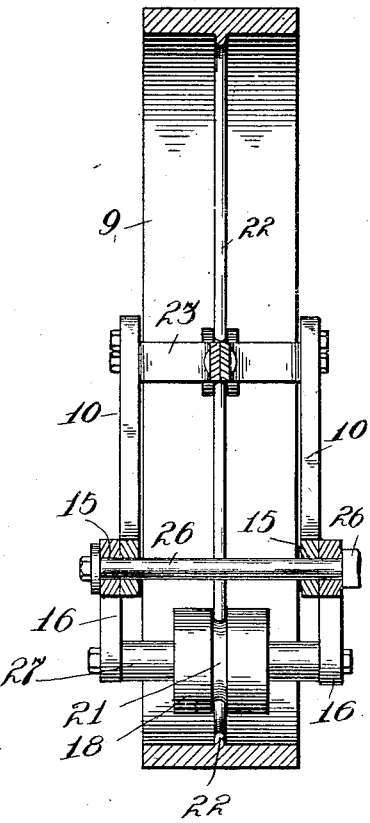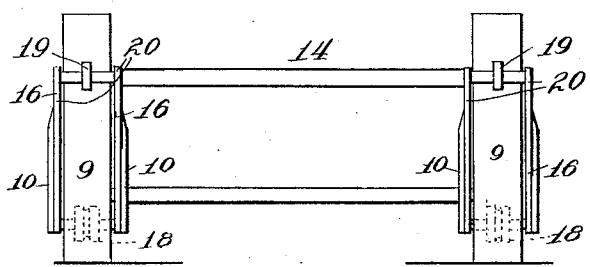

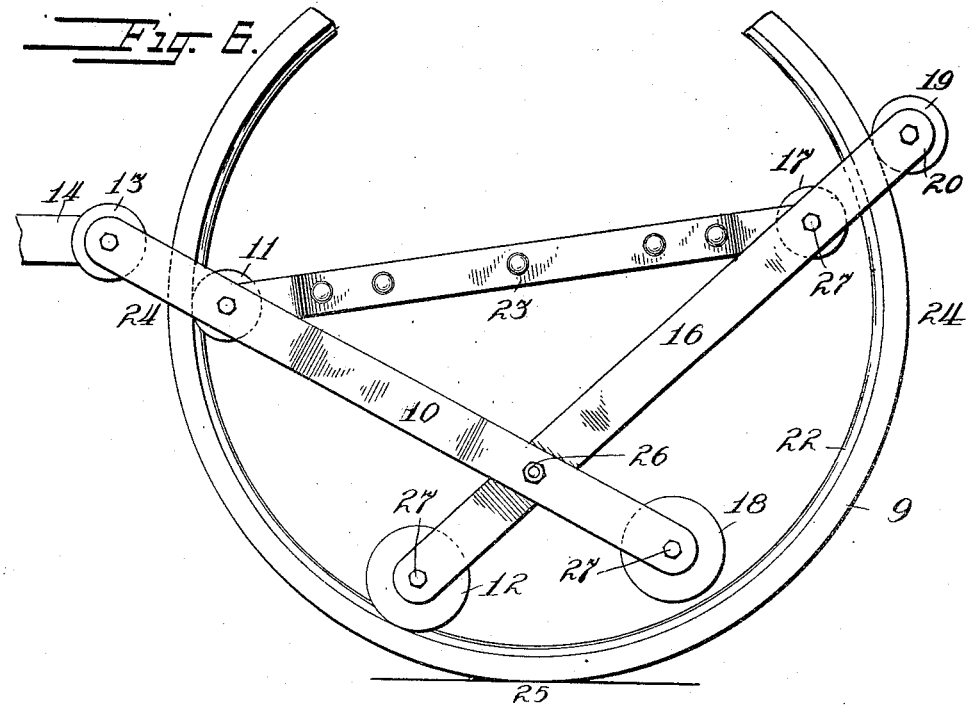
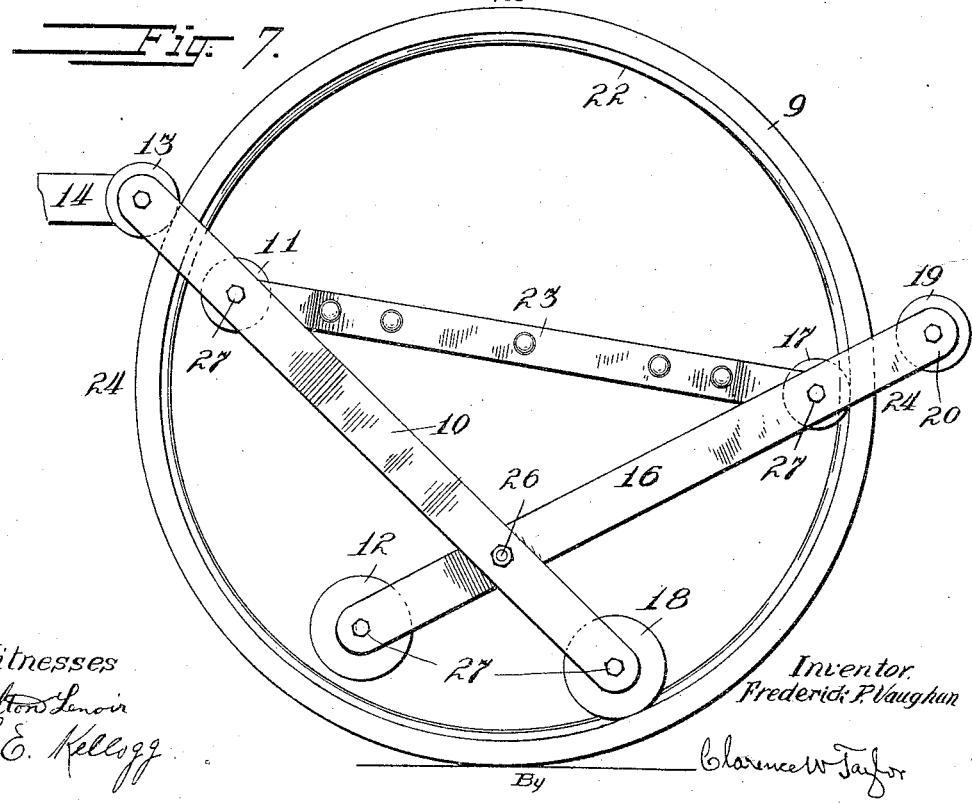

UNITED STATES PATENT OFFICE.

FREDERICK P. VAUGHAN, OF CHICAGO, ILLINOIS.

VEHICLE-WHEEL.

944,641.  Specification of Letters Patent.  Patented Dec. 28, 1909.

Application filed July 20, 1907. Serial No. 384,825.

*To all whom it may concern:*

Be it known that I, FREDERICK P. VAUGHAN, a citizen of the United States, residing at Chicago, in the county of Cook and State of Illinois, have invented certain new and useful Improvements in Vehicle-Wheels, of which the following is a specification.

My invention is an improvement in wheels, and, broadly, comprises means for the employment of a lever or levers to assist in the rotation of a wheel.

An important feature of my improvement consists in means to employ the load to aid in starting and in the rotation of the employ the load to oppose rotation of the wheel when the draft is not applied thereto.

A further feature of my improvement consists in the use of a lever of the second class in the wheel to support the load, and for vertical movement of the axle of the vehicle.

In its narrower aspects my invention consists in the various specific forms and parts and the combination and arrangement of parts hereinafter more specifically described, illustrated in the drawings, and particularly pointed out in the claims hereunto appended.

In describing the invention in detail reference is had to the accompanying drawings forming a part of this specification wherein like numerals of reference indicate corresponding parts throughout the several views, and in which—

Figure 1 is a side elevation of the wheel at rest. Fig. 2 is a horizontal section on line 2—2 of Fig. 1. Fig. 3 is a section on line 3—3 of Fig. 1. Fig. 4 is a top plan of two forward wheels with draft means connected. Fig. 5 is a rear elevation of two wheels. Fig. 6 is a side elevation of the wheel partly broken away, showing the load shifted to one side of the vertical diameter and the lever and draft beam bearing against the tread member for rotation of the wheel in one direction. And Fig. 7 is a side elevation of the tread member and the shiftable load support in position to move in an opposite direction.

In addition to a rotary tread member 9, I provide a load support capable of a variety of movements and consisting, essentially, of a plurality of second class levers pivotally mounted on the axle of a vehicle, their short ends fulcrumed on the inner surface of the tread member, and their long ends extending upwardly and outwardly beyond the periphery of the tread member. A draft beam 23 connects the long ends of the levers together. Near each end of the draft beam, and normally out of contact with the tread member are anti-friction elements 11 and 17. The short ends of the levers 10 and 16 have anti-friction elements, 12 and 18, which normally rest on the tread member on opposite sides of the vertical diameter of the wheel. The perimeters, 21, of the anti-friction elements are grooved to receive the half round track 22 of the tread member 9. On the outside of the tread member are friction elements, 13 and 19. The numerals 14 and 20 designate a point at which the draft may be applied to the long end of the levers. In my present structure the levers 10 and 16 form the equivalent for the hub and are apertured at 15 (see Fig. 3) to receive the axle 26 of the vehicle, which is positioned below the axial center of the tread member. It will be noted that the levers are composed of two halves, each mounted upon opposite sides of the tread member and in a plane outside thereof.

Each quadrant, that is to say, each arc of 90° from about the position of the reference numeral 25, of the tread member, 9, (shown in Fig. 6), in operation acts as a first class lever to aid in the movement of the vehicle over an obstruction, and the leverage is particularly effective when the anti-friction element 11, or 17, bears against the tread member. This gives the motive power a leverage and correspondingly reduces the amount of power required to move the load.

The anti-friction elements and the friction elements, through the axes of which pass the axles 27, the ends of which bear on suitable journal bearings formed in the levers and the draft beam, are thought to be common and to require no further description.

The weight of the load may be employed to aid in the rotation of the wheel by raising the short end of one or the other of the levers 10 or 16 from the track, which is accomplished by the application of power to the draft in either direction.

The long ends of the levers 10 and 16 are between the horizontal and the perpendicular diameters of the tread member, and are not long enough to permit an upward movement to the vertical diameter of the tread member, thus the friction elements limit independent movement of the load support.

Normally the draft beam and its anti-friction elements are out of contact with the tread member, but when sufficient power is applied to the draft in one direction or the other, one of the elements, 11 or 17, contacts with the tread member and thus limits the extent of oscillatory movement. The variations in the application of the draft and the force of gravity will cause oscillatory movement of the load support and will enable the employment of the load in starting, stopping and the rotation of the wheel in opposite directions. The entire shiftable load support constitutes an automatic gravity brake when there is a cessation of the motive power.

The draft is ordinarily connected to the upper and long end of one of the levers and wholly in advance of the tread member, but it is apparent the draft may be connected to other parts of the load support.

The axle of the vehicle engages the levers at intermediate points thereon. The lower arms being shorter than the upper arms of the levers, a load may easily be shifted vertically and in a fore and aft direction.

When the opposing forces of the draft and gravity permit the anti-friction element at the end of the draft beam to contact with the inner surface of the tread member, the wheel, between its horizontal and perpendicular diameters, is capable of operating as a lever (sometimes of the first class) to lift the load over an obstacle in the path of the wheel and assist in the onward movement of the vehicle. Manifestly the usual increase in draft to pass over an obstruction will not be required, and the shock to the vehicle and its acquired momentum will be materially lessened if not entirely avoided. As the draft is applied at a point outside of the tread member, it will at all times be forward of any obstruction met by the wheel.

Obviously with my present construction it is possible to transport heavy bodies with comparatively less motive power.

In operation it is apparent that the shiftable load support is capable of oscillatory movement, and, when no draft is being applied, operates by gravity to oppose rotation of the tread member. When draft is applied the load support has a vertical movement, as well as an oscillatory movement, and, depending somewhat upon the character of the road and the weight of the load, the support will oscillate between contact of one end or the other of the lever to which the draft is applied with the tread member.

I do not wish to be limited to the specific embodiment shown and described, as changes may be made without departing from the spirit and scope of my invention.

Having thus fully described my invention, what I claim as new, and desire to secure by Letters Patent, is—

1. In a wheel of the class described a load support comprising levers, means for rigidly connecting the long ends of the levers, anti-friction elements, and means for applying the draft to one of the levers.

2. In a vehicle wheel of the class described a shiftable load support comprising a plurality of levers carrying anti-friction elements near one end thereof and friction elements near the opposite ends, and a draft beam to connect the long ends of the levers.

3. A vehicle wheel comprising a rotary tread member, a plurality of shiftable load supports normally on opposite sides of the vertical diameter of the wheel, and means for applying the draft to the wheel outside of the tread member.

4. A vehicle wheel comprising a rotary tread member, load supporting means capable of a fore and aft movement independent of the tread member, anti-friction elements, friction elements, and means for applying the draft to the wheel.

5. A vehicle wheel comprising a rotary tread member, a load support comprising means operated by the draft and gravity for oscillatory movement thereof, anti-friction elements, means for limiting oscillatory movement of the load support, and means for applying the draft one side of the vertical diameter of the wheel.

6. A vehicle wheel comprising a rotary tread member, shiftable means normally bearing on the tread member on opposite sides of the vertical diameter of the wheel to support the load, means outside the tread member limiting independent movement of the load support, and means outside the tread member for connecting the draft to the load support.

7. A vehicle wheel comprising a rotary tread member, a shiftable load support, and a lever comprising that portion of the tread member between its horizontal and perpendicular diameters in the direction of the draft, to aid in the onward movement of the wheel.

8. A vehicle wheel comprising a rotary tread member, shiftable means normally bearing on the tread member on opposite sides of the vertical diameter of the wheel, and a lever consisting of that portion of the tread member between its horizontal and perpendicular diameters to facilitate movement of the wheel.

In testimony whereof I affix my signature in presence of two witnesses.

FREDERICK P. VAUGHAN.

Witnesses:
S. ELVA KELLOGG,
ONI B. STIMPSON.

Correction in Letters Patent No. 944,641.

It is hereby certified that in Letters Patent No. 944,641, granted December 28, 1909, upon the application of Frederick P. Vaughan, of Chicago, Illinois, for an improvement in "Vehicle-Wheels," an error appears in the printed specification requiring correction, as follows: Page 1, line 15, after the word "the," second occurrence, the words *wheel in opposite directions, and, also to* should be inserted; and that the said Letters Patent should be read with this correction therein that the same may conform to the record of the case in the Patent Office.

Signed and sealed this 25th day of January, A. D., 1910.

[SEAL.]

C. C. BILLINGS,

*Acting Commissioner of Patents.*